US005357683A

United States Patent [19]

Trevino

[11] Patent Number: 5,357,683

[45] Date of Patent: Oct. 25, 1994

[54] COMPACT CARPENTER'S MARKING TOOL

[76] Inventor: Hector Trevino, 2972 Royal La., Dallas, Tex. 75229-3604

[21] Appl. No.: 975,448

[22] Filed: Aug. 14, 1991

[51] Int. Cl.[5] .............................................. G01B 5/14

[52] U.S. Cl. ...................................... 33/528; 33/465; 33/764

[58] Field of Search ................. 33/451, 452, 465, 472, 33/528, 562, 761, 764, DIG. 10

[56] References Cited

U.S. PATENT DOCUMENTS

| | | | |
|---|---|---|---|
| 1,612,455 | 12/1926 | McGeorge | 33/528 |
| 3,808,690 | 5/1974 | Balder | 33/DIG. 10 |
| 3,842,510 | 10/1974 | Elliott | 33/528 |
| 3,885,314 | 5/1975 | Banas, Sr. | 33/764 |
| 4,589,210 | 5/1986 | Konrad | 33/562 |
| 4,696,113 | 9/1987 | Rice | 33/DIG. 10 |
| 4,793,069 | 12/1988 | McDowell | 33/528 |
| 4,930,382 | 6/1990 | Collins | 33/562 |

*Primary Examiner*—William A. Cuchlinski, Jr.
*Assistant Examiner*—G. Bradley Bennett
*Attorney, Agent, or Firm*—Jones, Day, Reavis & Pogue

[57] ABSTRACT

A marking tool that can be used for locating structural fixtures having a body portion, first and second perpendicular legs slidably contained entirely within the body portion. Each of the first and second legs are extensible from the body portion to position the body portion in a preselected location. At least one template is associated with the body portion such that adjusting the first and second legs positions the body portion and its associated template over a selected one of the fixtures for locating the same.

12 Claims, 3 Drawing Sheets

COMPACT CARPENTER'S MARKING TOOL

FIELD OF THE INVENTION

The present invention relates to a compact tool for quickly and efficiently locating and marking the positions of utility openings in panels to be attached to a wall during construction. The present invention also may be used as a level and an adjustable square.

BACKGROUND OF THE INVENTION

A constant problem in building construction is aligning openings in a panel to be attached to a wall with utility outlets previously installed on the wall. In a typical situation, electrical outlet boxes, water pipes, dryer exhaust pipes, HVAC vents or other utility outlets are installed within a wall frame. Wall panels, particularly Sheetrock and decorative paneling, are to be nailed to the wall frame. However, openings must be cut in the panels before the panels are attached to the wall to provide access to the utility outlets.

The problem arises because the location of an outlet must be measured from arbitrary reference points, usually the floor and a nearby wall frame stud, and the measurements must then be flipped and applied to the backside of a panel. This process must be done quickly and accurately during construction. Errors inevitably arise because of inaccurate measurements or miscalculations and, consequently, expensive materials are wasted.

Several devices have been developed to aid a carpenter in marking outlet openings on a panel. See, for example, U.S. Pat. Nos. 4,696,113 to Rice, 4,423,555 to Wootten, 4,285,135 to Minozzi, Jr., 4,228,592 to Badger, 4,059,907 to Dauber, 3,808,690 to Balder, 3,678,588 to Isola et al., 3,672,064 to Elkins et al., and 3,522,658 to Howell. The present invention combines many of the advantages of these devices while avoiding many of their disadvantages.

SUMMARY OF THE INVENTION

The present invention relates to a compact tool for marking wall outlet openings on a panel to be attached to the wall. In one embodiment, the tool comprises two hingedly attached telescoping members. At least one template is slidably connected to at least one of the telescoping members. Templates may be provided for a variety of outlet types. The tool is used by placing the end of one telescoping member on a reference point that will be on the edge of the panel when it is attached to the wall. At least one template is aligned with at least one wall outlet. The end of the remaining telescoping member is placed on a second reference point that will be on another edge of the panel when it is attached to the wall. The tool is then placed against the panel and the panel is marked using the templates. When not in use the telescoping members are closed to their minimum length and brought together at the hinge attachment, enabling the tool to be conveniently stored and transported in a carpenter's tool box.

In the preferred embodiment, the tool is substantially a right triangle with equal sides. The tool houses two spooled measuring tapes that are extensible outwardly from the outer ends of the two sides at right angles to each other. An opening for a template is formed in the body of the tool. Bubble levels may be placed on the body to position the tool horizontally and vertically. Again, the tool is used by placing one end of a measuring tape on a reference point that will be on the edge of the panel when attached to the wall. The template opening is aligned with at least one outlet. The end of the remaining measuring tape is placed on a second reference point that will be on another edge of the panel when it is attached to the wall. The tool is then placed against the panel and the panel is marked using the opening. When not in use, the measuring tapes are returned to their spooled positions by spring mechanisms on the spool.

BRIEF DESCRIPTION OF THE DRAWINGS

These and other objects of the present invention will be more clearly understood in connection with the accompanying detailed description of the attached drawings in which.

DETAILED DESCRIPTION OF THE PREFERRED EMBODIMENT

Figures 1, 2, 3, 4:
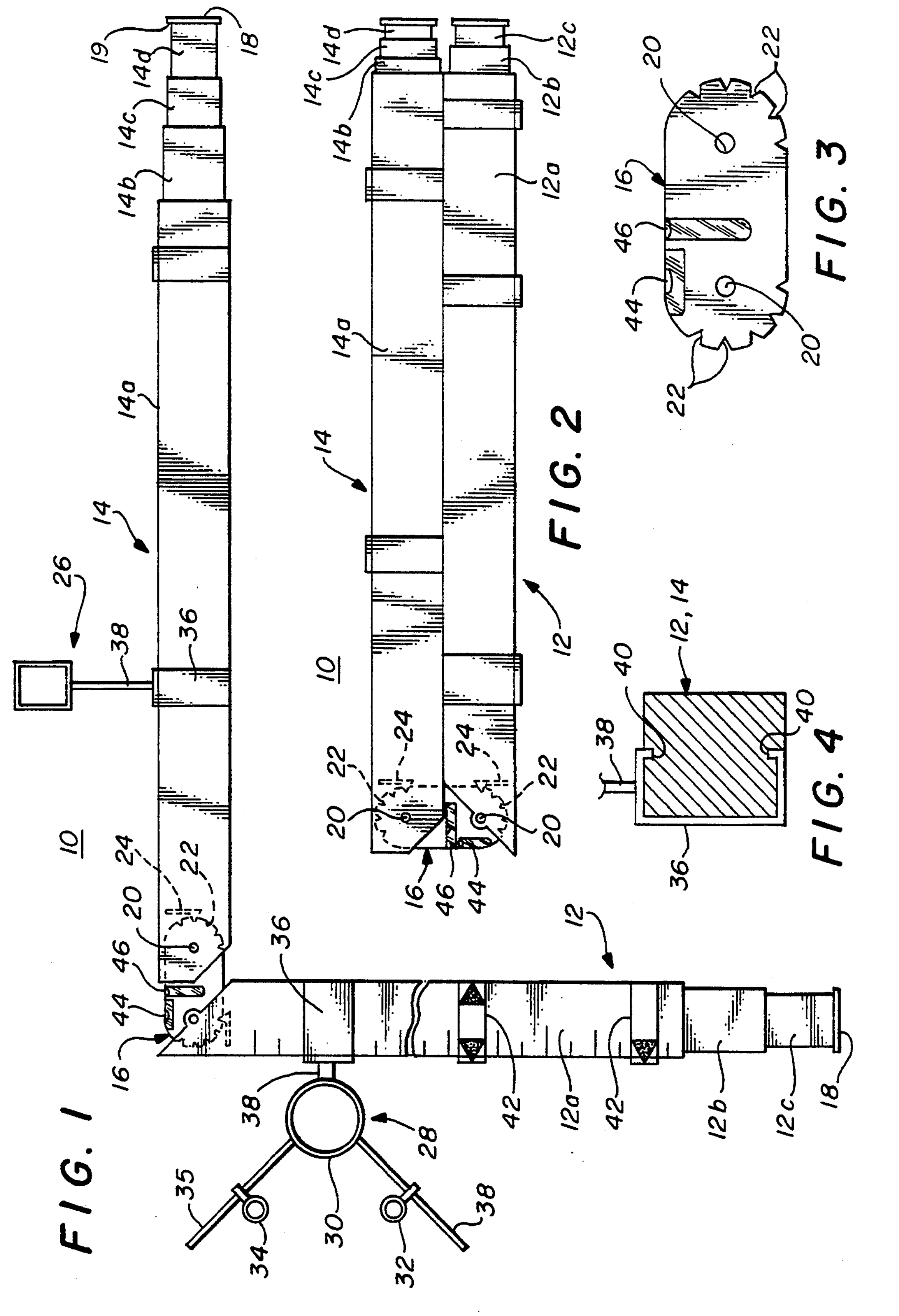
FIG. 1 is a plan view of the tool of the present invention ready for use.
FIG. 2 is a plan view of the tool of FIG. 1 in its folded state.
FIG. 3 is a plan view of the hinge connecting the two arms of the tool of FIG. 1.
FIG. 4 is a partial cross-sectional view of one arm of the tool illustrating the manner in which a template is attached to the arm for slidable movement.

As shown in FIG. 1, the marking tool 10 of the present invention generally comprises a first telescoping member 12 and a second telescoping member 14, each attached to an end of hinge member 16. Each elongated telescoping member 12, 14 preferably is constructed of a high impact plastic to be lightweight and durable. Each telescoping member 12, 14 is further comprised of elongated nested members **12*a*, 12*b* and 12*c*, and 14*a*, 14*b*, 14*c* and 14*d***, respectively.

Nested members **12*a*–*c* and 14*a*–*d*** are sized so that the external width and depth of a nested member is substantially the same as the internal width and depth of the member in which it is nested. The nested members are sized so that there is little play between two adjacent nested members; therefore, the nested members may be extended without bending. In addition, in the preferred embodiment the nested members are sized so that there is sufficient friction between adjacent nested members to prevent unintended slippage of the nested members. In alternate embodiments other means of securing adjacent nested members may be provided, such as thumb screws or wing nuts and bolts inserted through regularly spaced holes through the nested members, or the cooperation of a ball bearing placed on one surface of a nested member with regular indentations on an adjacent surface of an adjacent nested member.

In the embodiment of FIG. 1, first member 12 is comprised of three nested members and second member 14 is comprised of four nested members. It is not material how many members are nested in each telescoping member, as it will be appreciated that fewer nested members of greater length may achieve much the same result as more nested members of lesser length. One of the unique features of the present invention is the compact size of the tool. Therefore, it may be desired to provide a tool with a relatively large number of relatively short nested members, such a tool being relatively short but wide when fully closed, as compared with a tool with relatively few long nested members, such a tool being relatively long but narrow when fully closed. The preferred embodiment is believed to provide a desirable balance between the width and length of the tool when fully closed for storage or transport in a tool box.

It is a feature of the invention, however, that one telescoping member may have a greater extended length. The length disparity of the telescoping members reflects the typical placement of a utility outlet near the edge of a wall. It may be observed that electrical outlets, for example, are either close to the ground, in the case of a plug outlet, or close to a doorway, in the case of a switch outlet, for ease of use. Thus, it is not usually necessary to have telescoping members of equal length because one member will usually be extended to a relatively near wall edge.

In the preferred embodiment each of the members 12 and 14 are approximately 16″in length and each nested member **12*a–c* and 14*a–d* is approximately twelve inches long. The outer nested members 12*a*, 14*a* may have width and depth dimensions appropriate for a tool of a desired size. The inner nested members 12*b*, 12*c*, 14*b*, 14*c* and 14*d*** are sized to provide little play between the members as described above.

Cap 18 is attached to each innermost nested member **12*c*, 14*d*. Cap 18 preferably is constructed of a pliable non-skid plastic and is formed to fit securely within a recess in the end of each nested member 12*c*, 14*d*. Cap 18 helps keep the tool from slipping while it is being positioned for locating or marking an outlet. Cap 18 is provided with a flange 19 that prevents innermost nested members 12*c*, 14*d*** from being inserted too far into the other nested members to be grasped and extended.

Telescoping members 12, 14 are connected by hinge member 16. As shown in FIG. 3 hinge member 16 is generally oval. It will be appreciated that various type of hinges may be used. Rivets 20 attach each telescoping member 12, 14 to hinge member 16. The shape of hinge member 16 and the proximal ends of outermost nested members **12*a*, 14*a* are such that the tool may be adjusted to extreme positions where telescoping members 12, 14 are at right angles to or side-by-side and parallel with each other as shown in FIGS. 1 and 2**, respectively.

Hinge 16 has indentations 22 along its periphery that cooperate with a catch 24 within the proximal end of each telescoping member 12, 14. In the preferred embodiment catch 24 is a spring-loaded ball bearing within a bore. The cooperation of an indentation 22 and catch 24 allows each telescoping member 12, 14 to be secured at given positions relative to hinge 16. In use the members 12, 14 will most often be secured relative to hinge 16 such that the members form an angle of 0°, 90° or 180° relative to each other. Thus, in the embodiment shown, at least two indentations are provided on the periphery of hinge 16 for each member 12, 14, although more may be provided as desired. In the embodiment shown, catch 24 is disengaged from an indentation by an external force applied by the user to hinge 16 and a member 12, 14, forcing the catch bearing 24 out of the indentation 22. Other catch means, such as a latch, may be used as will be apparent to one familiar with the art.

Templates 26, 28 are slidably connected to members 12, 14. Each template 26, 28 may be removed from a member 12 or 14 and connected to the other member 12 or 14. As shown in FIG. 1, template 26 is shaped to represent an electrical outlet. Main template 28 has supplemental templates 32 and 34 slidably mounted on pivotable extensions 33 and 35, respectively, representing water pipes. Circular member 30 represents a drainage pipe. Of course, other template shapes may be provided to represent other utility outlets. Each template 26, 28 is connected to clasp 36 by an extension 38. Clasp 36 substantially conforms to three sides of the outer surface of nested members **12*a*, 14*a*. Clasp 36 is made of a stiff but flexible material so that the clasp can be clipped onto and removed from a nested member 12*a*, 14*a*. Flanges are provided on each clasp 36 to cooperate with grooves 40 along the longitudinal edges of nested members 12*a*, 14*a* holding the clasp 36 to a nested member 12*a*, 14*a* as shown in FIG. 4. A template 26, 28, connected to a nested member 12*a*, 14*a* by clasp 36, can be slid along the entire length of the member 12*a*, 14*a*. Each member 12*a*, 14*a* may have a measuring scale 40 thereon with slidable markers 42 providing an indication of a fixed measuring point on scale 40. Such measurements could be used in a number of ways. Also, bubble levels 44 and 46 may be placed in hinge 16 for use in aligning the members 12 and 14** with the vertical and horizontal.

Figure 5:
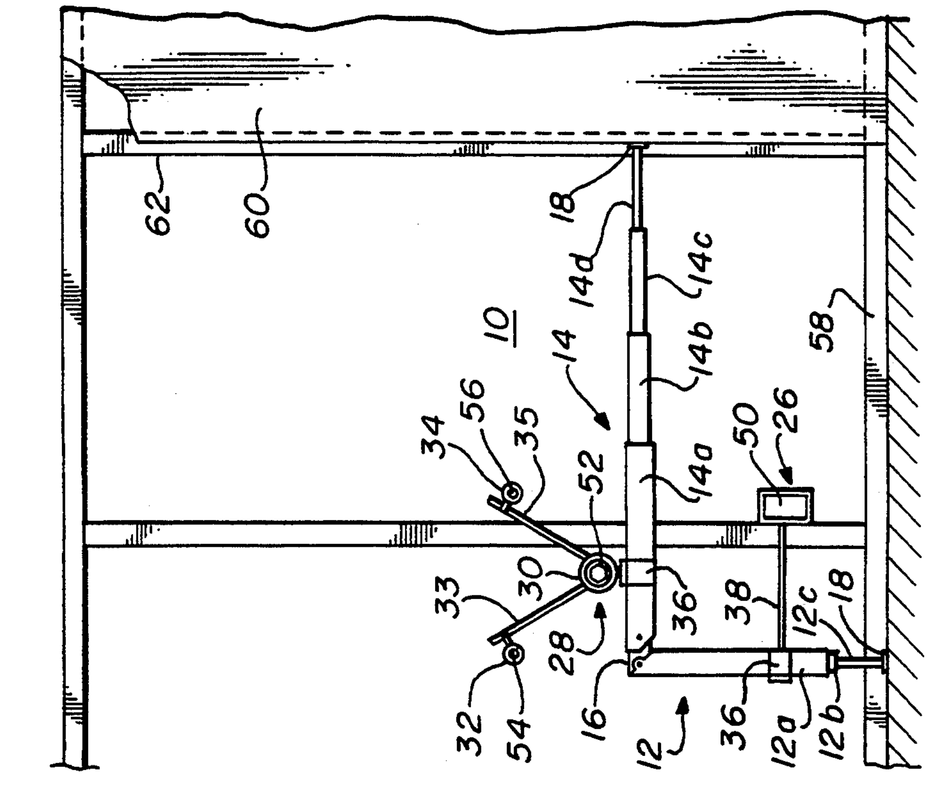
FIG. 5 is a plan view of the tool in use during measurement of the location of utility outlets.

Referring now to FIG. 5, the tool 10 is shown locating an electrical outlet 50, a drainage pipe 52 and water pipes 54 and 56. The tool 10 is used by opening the members 12, 14 about hinge 16 such that a 90° angle is defined between them. At least one template 26, 28 is connected to at least one nested member **12*a*, 14*a*. For example, the template 26 is slid along the length of the nested member 12*a* and oriented against a utility electrical outlet 50. Nested members 12*b* and 12*c* and 14*b*, 14*c* and 14*d* are extended until caps 18 are positioned against desired reference points, such as the floor stud 58 and wallboard 60, which partially covers vertical stud 62. These reference points are selected to correspond to the edges of the next wallboard sheet or other material that is to be fastened to the wall. The tool is held in this position by the cooperation of the indentations in hinge 16 and catch 24 by the friction between nested members 12*a–c*, 14*a–d* and by friction between the clasp 36 and nested members 12*a*, 14*a***.

The tool, having been oriented against a wall such that templates 26, 28 mark the positions of utility outlets 50, 52, 54 and 56 in the wall, is then removed from the wall and laid against a piece of building material, such as wallboard or paneling. The tool is laid down on the material such that caps 18 on the distal ends of members **12*c*, 14*d* are oriented at the edges of the material to be marked. Using templates 26, 28** the locations of the utility outlet openings are traced onto the wall material. The tool is removed and the openings are cut in the material and the sheet of material attached to the wall with the utility opening in the material matching the actual utility outlets.

Figure 6:
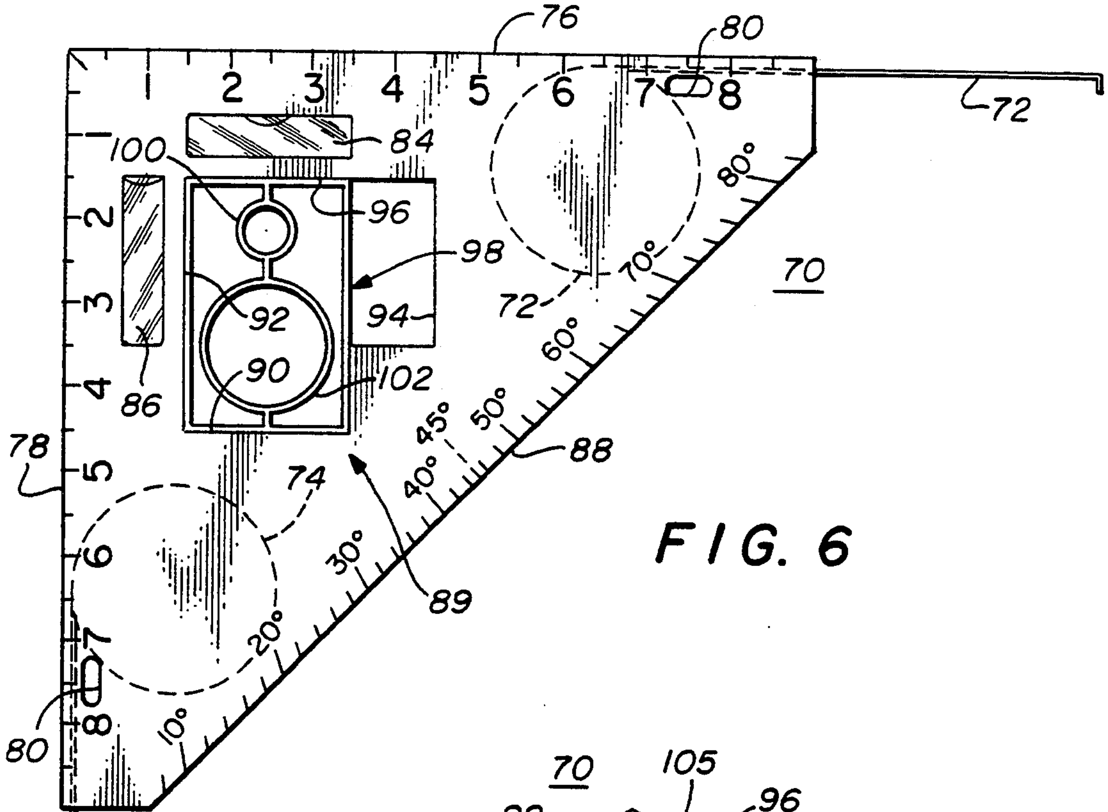
FIG. 6 is a plan view of the preferred embodiment of the present invention.

The preferred embodiment of the present invention is shown in FIGS. 6–9. The tool 70 of FIG. 6 is substantially a right triangle with equal sides. It has a thickness approximately equal to 1 ⅝″, sufficient to accommodate a spool of metallic measuring tape, as will be seen hereafter.

Figure 7:
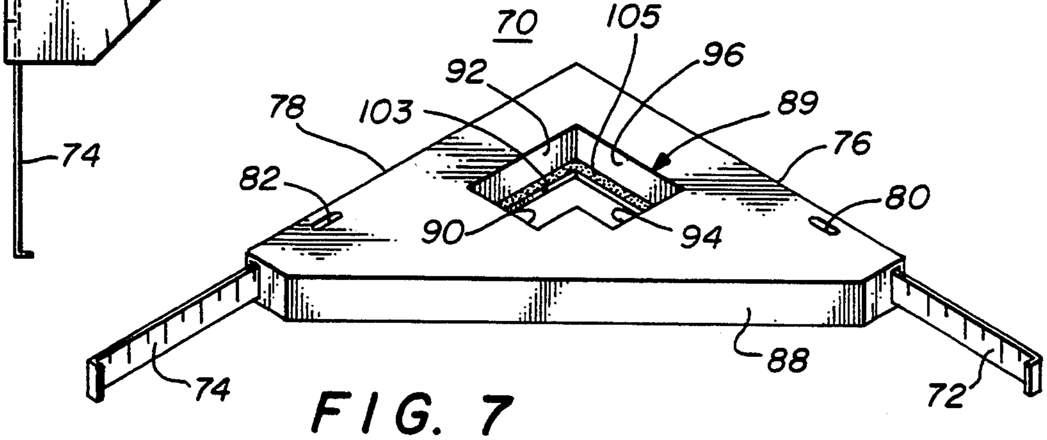
FIG. 7 is an isometric view of the preferred embodiment of the present invention.

The tool houses two semirigid spooled measuring tapes 72 and 74 well-known in the art. The tapes are positioned in and extend outwardly along the tool sides 76 and 78 that define the right angle. Each extended tape 72 and 74 is self-locked into position in a conventional manner by lock buttons 80 and 82 when the tape end is extended the desired amount. An extended tape is released by depressing buttons 80 and 82. A released tape 20 will return to its spooled position by a coiled spring mechanism contained within the tool (not shown) as is well known in the art. Each tape 72 and 74 is marked in units of linear measurement as shown in FIG. 7, preferably in inches, so that the tool may be used as a conventional measuring tape. Each tape may have a limited length such as, for instance, four feet.

It may be desired to embellish the tool 70 previously described with bubble levels 84 and 86 set in parallel with one or both of the edges 76 and 78 of the tool 70 as shown in FIG. 7, enabling the tool 70 to be used as a level. One or both of the edges 76 and 78 may be marked with units of linear measurement, as shown in FIG. 7, enabling the tool 70 to be used as a conventional measuring device.

Further, the hypotenuse 88 of the tool 70 may be marked in degrees to indicate angular position from the apex of the right triangle with respect to one edge 76 or 78. In addition, the tool 70 has an L-shaped opening 89 in the body thereof. The L-shaped opening 89 has one short bottom wall 90 and an elongated vertical wall 92 which together represent the approximate size of an electrical outlet for use in construction. In addition, the small vertical leg 94 and elongated horizontal leg 96 represent the same size of the standard conventional electrical outlet except with the elongated portion in horizontal plane. The L-shaped opening 89 will allow the user of the tool 70 to accurately position an electrical outlet on a wall being constructed so that it can be transferred to the wallboard or other material to be placed on the wall and accurately marked thereon for cutting.

Figure 8:
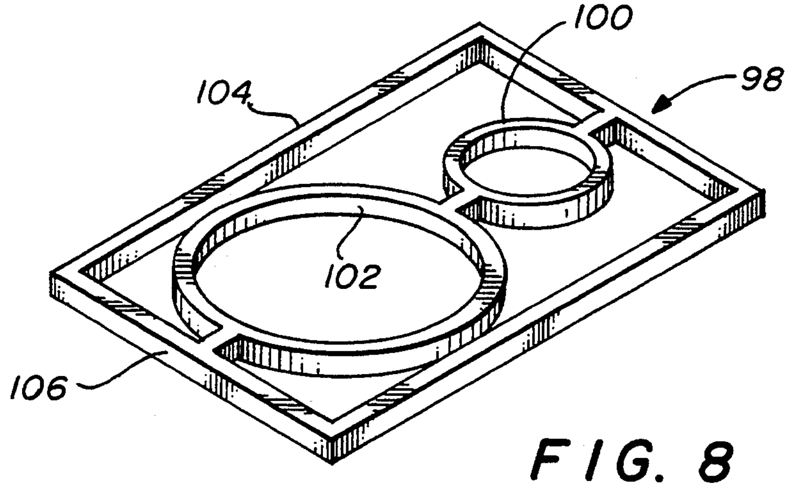
FIG. 8 is an isometric view of a template to be used with the tool of FIG. 6.

The tool 70 can also be used to position, or determine the position of, pipes that are mounted in the wall of a structure and which need to be accurately located so that openings can be cut in wallboard or other material that are to be positioned on the wall. Thus, as illustrated in FIG. 8, a template 98 is sized in length and width to fit in the orifice 89 in tool 70 in either the horizontal or the vertical opening. The outer edges 104 and 106 may be made of magnetic material so as to interlock with metallic edges 103 and 105 formed in the bottom of the L-shaped opening 89 in the body of the tool 70, thus holding itself in place in the slot 89.

Figure 9:
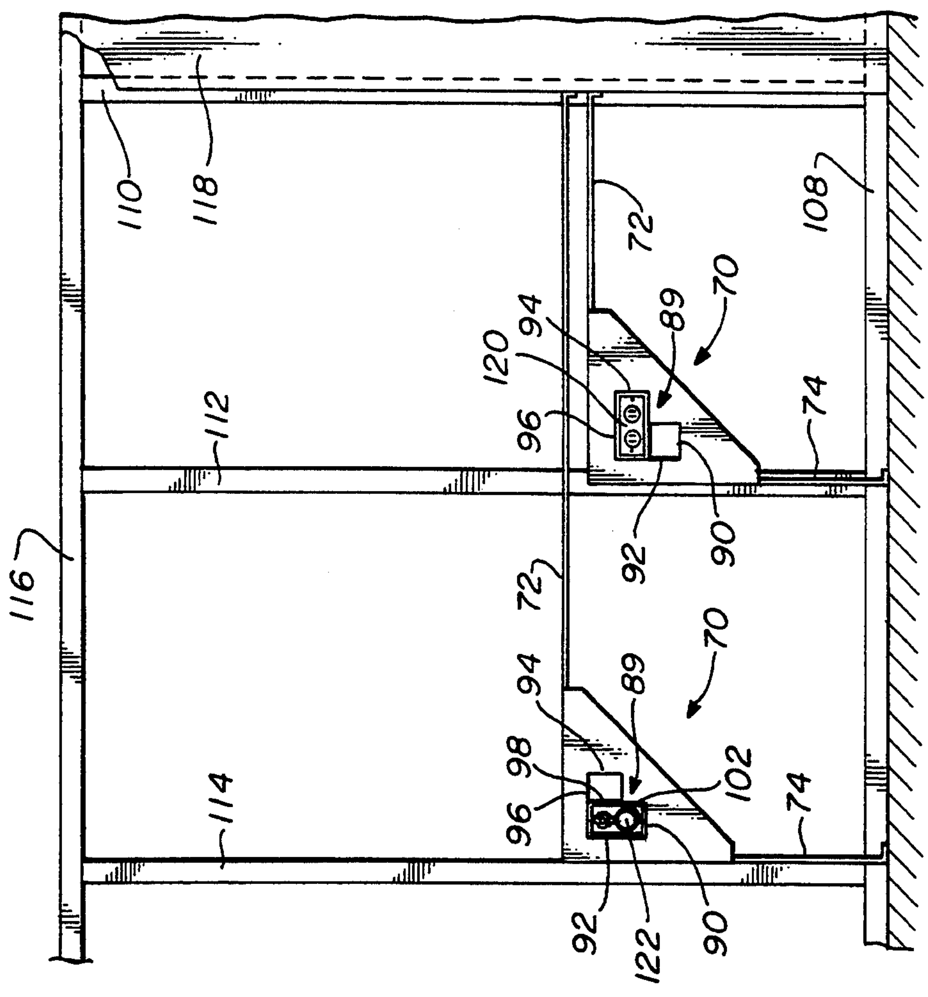
FIG. 9 is a plan view of the tool in use during measurement of the location of a utility outlet.

FIG. 9 illustrates the use of tool 70 to properly locate electrical outlets and water pipes.

Consider the use of the tool 70 in FIG. 9 to accurately locate an electrical outlet 120. The structure in consideration has a horizontal floor stud 108, vertical studs 110, 112 and 114 and ceiling horizontal stud 116. A sheet of covering material 118 such as Sheetrock, for instance, is shown partially covering and attached to vertical stud 110. In order to place the next panel of Sheetrock on the wall portion, an opening must be cut in the Sheetrock panel for electrical outlet 120. In order to make this cut, the tool 70 is placed such that the vertical portion of slot 89, including the base 90 and elongated portion 92, are placed over the electrical outlet 120. The tape 74 is then extended outwardly and downwardly from the tool 70 until it touches the floor. The other tape 72 is then extended outwardly to the right horizontally until it contacts the Sheetrock 118. The two tapes can be locked in that position and the tool 70 transferred to the next panel of Sheetrock to be installed such that the opening for the outlet 120 can be marked simply by inscribing along lines 90, 92 and 96. The opening can then be cut in that piece of Sheetrock and it can then be, in turn, installed by attaching it to the vertical studs 110 and 112. The opening that is cut will then exactly fit over the electrical outlet 120.

Suppose also that it is desired to locate a water pipe 122. As can be seen in FIG. 9, the tool 70 is positioned with the template 98 in L-shaped slot 89 until orifice 102 in template 98 aligns itself with pipe 122. In that position, the tape 72 is extended to the right until it contacts the nearest point of reference, such as Sheetrock 118, and the other tape 74 is extended until it touches the next point of reference which may be, for instance, the floor. The tapes are locked in that position. Now by simply lifting tool 70 and transferring it to the next piece of Sheetrock, the opening 102 can be inscribed for the pipe 122.

Thus, there has been disclosed, in the preferred embodiment, a triangular tool which has tapes extendible from the outer ends of each of the sides of the tool such that the tool can be positioned vertically and horizontally with respect to given reference points. An L-shaped opening is formed in the tool which has a short side and a long side in the vertical plane that correspond to the typical electrical outlet size and a horizontal portion having a long side 96 and a short side 94 which again correspond to the size of a typical electrical outlet so that outlets can be positioned in both the horizontal and vertical planes. Once the tool has been positioned over an outlet, the two tapes can be extended perpendicular to each other until they contact various reference points and then locked in that position so that the position of the electrical outlet opening can be fixed and transferred to the next piece of material, such as a Sheetrock panel, that is to be installed and the opening properly cut in that piece of material. The tool has indicia representing linear measurement along each leg of the right triangle, as well as angular markings on the hypotenuse thereof. Bubble levels are placed along both of the perpendicular legs of the triangle so that it can be properly leveled in either direction. An opening is formed in the level which is L-shaped and formed by the intersection of a horizontal and a vertical rectangle. The rectangles have the size of a standard electrical outlet typically used in construction. A template can be inserted in the opening which has one or more orifices therein corresponding to the size of water pipes so that water pipes can also be located with this device.

In the alternate embodiment, a carpenter's tool is formed of two arms joined together such that they can extend in an elongated fashion in alignment with each other or be folded in parallel with each other. The tool has extensible arms which have sections that telescope within each other. Thus the tool can be positioned over a large distance from a reference point and yet be folded to a small size for carrying. Each of the arms has a movable template associated with it that allows positioning with respect to electrical outlets and water pipes and drain pipes. The hinge joining the two arms has notches therein for enabling one arm to be positioned with respect to the other at preset angles. Further, the hinge has bubble levels therein so that the tool can be accurately positioned horizontally and vertically. Each arm, of course, has units of measure marked thereon so that the device can be used as a marking tool also.

Thus the alternate embodiment can be used as a framing square, a 32-inch level, a 32-inch straightedge, an angle locator, a roof pitch locator, an 8-foot gauge and a fixture locator.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A marking tool that can be used for locating structural fixtures comprising:

a unitary hollow body portion;

first and second arms slidably contained entirely within said unitary hollow body portion, each arm having telescopic elements that are slidably extensible from a minimum to a maximum length;

each of said first and second arms being extensible perpendicular to each other to position said body portion in a preselected location;

means for pivotally coupling said arms together at two spaced pivot points, such that said arms can move continuously from a position in axial alignment with each other, to a position side-by-side and parallel to each other; and at least one template associated with said body portion such that by adjusting the length of said first and second arms, said body portion and its associated template may be positioned over a selected one of said fixtures for locating the same.

2. A marking tool as in claim 1 further including:

said at least one template being slidably attached to at least one of the first and second arms for positioning in the vertical and horizontal planes.

3. A marking tool as in claim 2 wherein said template further comprises:

a main template portion;

at least one extension pivotally attached to said main template; and a supplemental template slidably mounted on said at least one extension such that after positioning said main template over a selected fixture, the at least one extension can be pivoted and the supplemental template slid therealong to locate a second fixture.

4. A marking tool as in claim 3 further comprising:

a series of position detents on said pivotal coupling means for defining fixed angles of rotation of said first arm with respect to said second arm; and a ratchet member on each arm for engaging corresponding detents on said pivotal coupling means to enable said arms to be locked at fixed angles with respect to each other from 0° to 180°.

5. A marking tool as in claim 4 further comprising:

measuring indicia on each of said first and second arms to enable said first and second arms to be used as measuring instruments.

6. A marking tool that can be used for locating structural fixtures comprising:

a right triangular shaped hollow body having two acute angles;

first and second arms slidably contained entirely within said unitary hollow body portion;

each of said first and second arms being slidably extensible from inside the right triangular shaped body from each acute angle perpendicular to each other to position said body in a preselected location; and at least one template associated with said body such that by adjusting the length of said first and second arms, set body and its associated template may be positioned over a selected one of said fixtures for locating the same.

7. A marking tool as in claim 6 wherein said first and second legs comprise:

a semirigid metallic ribbon wound on a spring-loaded spool in the outer apex of each acute angle portion of the right triangular shaped body such that each ribbon can be extended outwardly perpendicular to the other a predetermined distance and automatically reeled in by said spring-loaded spool; and means associated with each ribbon for locking the ribbon in the extended position to prevent said ribbon from being wound in by the spool until said locking means is released.

8. A marking tool as in claim 6 further including:

said at least one template being an opening formed as a portion of said right triangular shaped body such that extension of said first and second legs positions said template in both vertical and horizontal planes.

9. A marking tool as in claim 8 wherein said template opening further comprises:

a first template opening formed to locate a fixture in the vertical plane; and a second template opening overlapping and forming part of the first template opening for locating a fixture in the horizontal plane.

10. A marking tool as in claim 9 further comprising:

a semirigid template form for removable insertion in either of said first and second template openings; and said semirigid template form having specific fixture shapes therein for locating specific fixtures.

11. A marking tool as in claim 10 further comprising:

a magnetic border on said semirigid template form to hold said template in said first and second template openings.

12. A marking tool as in claim 6 further comprising:

a bubble level inserted along each side of the right triangular shaped body such that such body can be oriented in the vertical and horizontal planes.

* * * * *